UNITED STATES PATENT OFFICE.

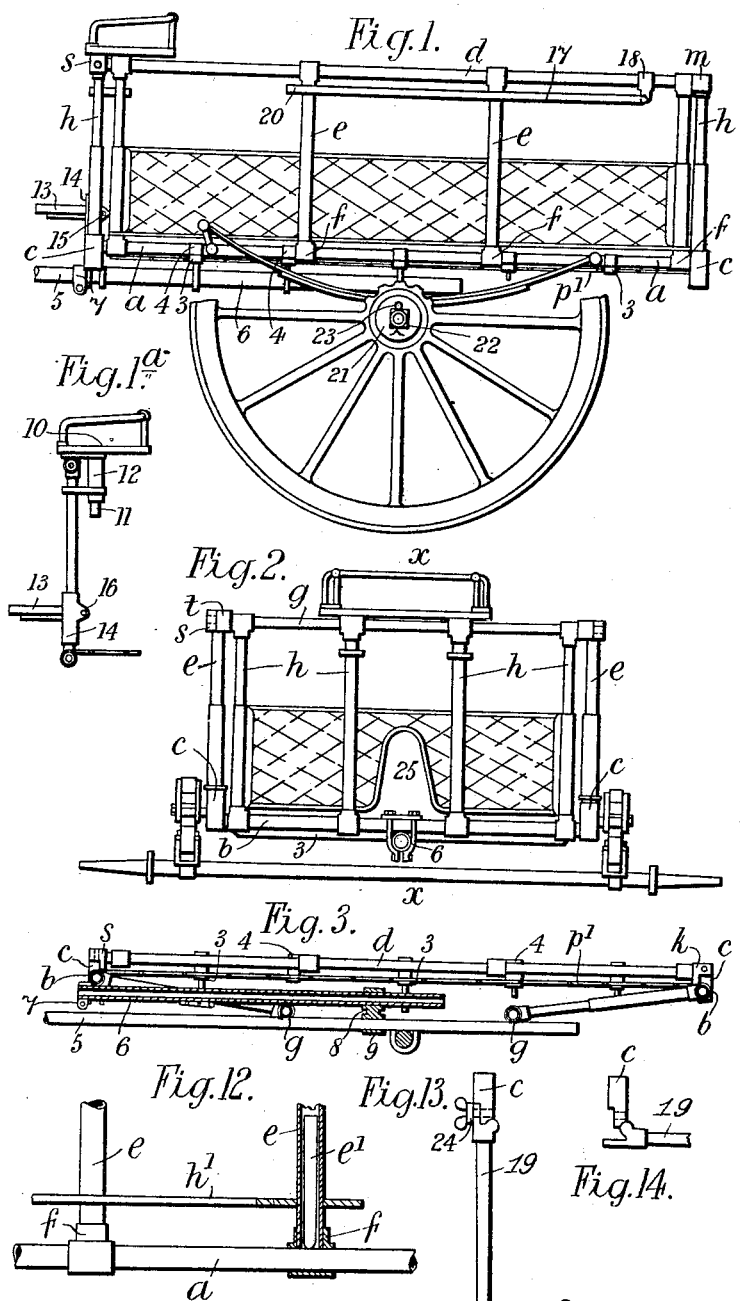

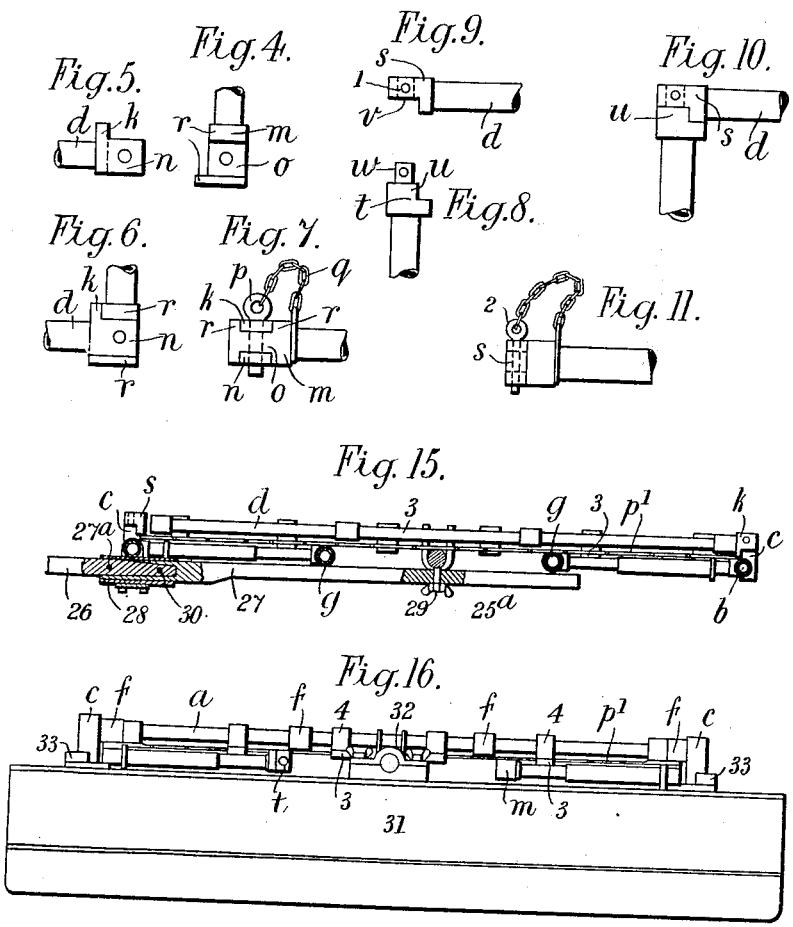
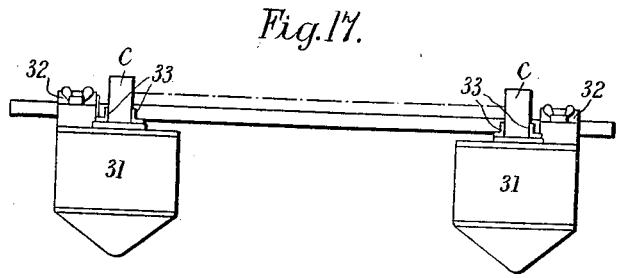

WALTER D. DOUGLAS-JONES, OF WESTMINSTER, ENGLAND.

CART AND WAGON ADAPTED MORE ESPECIALLY FOR MILITARY USE.

1,117,987.  Specification of Letters Patent.  Patented Nov. 24, 1914.

Application filed June 3, 1911. Serial No. 631,100.

*To all whom it may concern:*

Be it known that I, WALTER DOUGLAS DOUGLAS-JONES, a subject of the King of England, and residing at St. Stephens House, Victoria Embankment, in the city of Westminster, England, have invented certain new and useful Improvements in and Relating to Carts and Wagons Adapted More Especially for Military Use, of which the following is a specification.

This invention relates more especially to military carts and wagons, but may be applied to carts and wagons generally including carts for invalids, and has for its main object to construct such carts and wagons so that they can be very readily folded up for storing or transport, while being of a very simple and cheap construction, and has the further object of making such carts and wagons to be readily adaptable as pontoons for transporting persons or goods across rivers and the like or for forming part of a bridge.

An important feature of the invention as broadly described, consists in adapting the sides of a cart or wagon to be folded against one face of the floor, preferably the upper, and the ends to be folded against the other face of the floor but the invention comprises also certain details hereinafter set forth.

In order that the invention may be clearly understood I will now describe the same with reference to the drawings herewith of which:—

Figure 1 is a side elevation of a cart for general purposes constructed in accordance with the invention, but showing the outer end of the draft pole broken away and also showing the upper half of the wheel broken away to show the parts behind more clearly. Fig. 1ª is a view illustrating the attachment of a seat to the cart. Fig. 2 is a front end view of the cart but without the wheels. Fig. 3 is a longitudinal sectional view of the cart with its side and end members folded up and showing the ends as secured, in their folded up position, by the draft pole, the section being taken in the plane indicated by line *x x* of Fig. 2. In this Fig. 3 the axle springs and clips therefor are omitted for the sake of clearness. Fig. 4 (Sheet 2) is a plan view to an enlarged scale of a joint member at the right hand end (as seen from the front of the cart) of the top bar of the folding rear member. Fig. 5 is a plan view of the corresponding joint member on the rear end of the right hand folding side member. Figs. 6 and 7 are respectively a plan and rear elevation of the joint formed by the two joint members shown in Figs. 4 and 5. Fig. 8 is a plan view to an enlarged scale of a joint member at the left hand end of the top bar of the folding front end member. Fig. 9 is a plan view of the corresponding joint member of the front end of the left hand side member. Figs. 10 and 11 are respectively a plan and front elevation of the joint formed by the two joint members shown in Figs. 8 and 9. Fig. 12 is a view to an enlarged scale illustrating a method of strengthening a side or end member and also a method of lubricating the joints between the sides or ends and the cart frame. Figs. 13 and 14 illustrate a method by which folding legs or supports may be hinged to the corners of the cart. Fig. 15 is a longitudinal section of a modification of the invention which is specially applicable to military carts. In this view the cart is shown as folded up. Fig. 16 is a side elevation of the folded up cart shown in Fig. 15 but having attached to it pontoons; and Fig. 17 is a somewhat diagrammatic end view of the cart shown in Fig. 16 to illustrate the pontoons in end elevation and show their attachments to the cart frame.

Referring first to Figs. 1 to 12 of the drawings herewith the main frame of the cart is formed by two side bars or tubes *a* and two end bars or tubes *b* joined together rigidly at the four corners of the cart by rectangular shaped corner pieces *c*. The corner pieces *c* are made of such a height as shown as to permit of the side bars *a* joining into them somewhat above the level where the end bars *b* join in for a purpose hereinafter stated.

Each side member of the cart comprises a top bar *d* carried at the upper ends of suitable stanchions *e* rigidly attached to it such as by the T-pieces shown. The lower ends of the stanchions *e* have T-pieces *f* which embrace the corresponding side bar *a* but so as to be capable of turning thereon. To avoid end play the end stanchions are placed so as to come against or in close proximity to the corner pieces *c*.

Each end member of the cart comprises a top bar $g$ carried at the upper ends of suitable stanchions $h$ similar to the stanchions $e$ and connected to the bar $b$ similarly as the stanchions $e$ are connected to the bar $a$.

The lower ends of the stanchions may be connected together in any suitable manner such as by metal strips $h'$ (Fig. 12) if desired to strengthen the construction of the side and end members, or if desired other suitable strips, rods or wires may be provided for a like purpose.

The T-pieces $f$ which embrace the side bars $a$ and also the T-pieces which embrace the end bars $b$ may be lubricated by providing in the hollow stanchions solid bars of relatively hard lubricant $e'$ (see Fig. 12) said bars of lubricant bearing at their lower ends upon the bars $a$ or $b$ as the case may be. Each bar of lubricant must of course be inserted before the upper T-piece is secured to the respective stanchion.

At the rear ends of the top bar $d$ of the side folding members are joint members $k$ the right hand one of which is shown in plan to an enlarged scale in Fig. 5, and on the ends of the top bar $g$ of the rear folding member are joint members $m$ the right hand one of which is shown in plan to an enlarged scale in Fig. 4. It will be seen that the joint member $k$ has two cheeks $n$ which are adapted to embrace a web portion $o$ of the member $m$ while flanges $r$ $r$ on the joint member $m$ are adapted to embrace the said cheeks $n$ on the member $k$. After the members $m$ on the end member have been brought into engagement with the members $k$ on the side members each joint is secured by a pin $p$ passed through holes in the cheeks and web. Each pin $p$ may be secured to the cart frame by a suitable chain $q$ (see Fig. 7).

At the front end of the top bar $d$ of each side member is a joint member $s$ the left hand one of which is shown in plan to an enlarged scale in Fig. 9, and on the ends of the top bar $g$ of the front folding member are joint members $t$ the left hand one of which is shown in plan to an enlarged scale in Fig. 8. It will be seen that the joint member $t$ has a projection $u$ adapted to enter a recess $v$ in the joint member $s$ and also a dowel $w$ adapted to enter a hole 1 in the member $s$. After the engagement of the members $s$ and $t$ they are secured by a pin 2 (see Fig. 11) which is passed through holes in the member $s$ and dowel $w$. The pin 2 may be secured to the cart frame similarly as the pin $p$ is secured.

While it is preferred to use the joints in the manner above described the various joints could be reversed, or those described as used at the back of the cart could be used also for the front and vice versa. It will be seen that each of the above joints, when the parts thereof are engaged, becomes a complete rectangular block and has a very neat appearance.

The bottom or floor $p'$ of the cart is supported upon cross bearers 3 which are conveniently made of T-section except for their ends 4 which are formed as plain strips and are secured to the bars $a$ by being lapped therearound. The floor may consist conveniently of wire-work or wooden boards and is arranged so as to be sufficiently below the level of the bars $a$ as to allow the side members to lie down neatly upon the bottom or floor when the sides are folded down.

The draft pole 5 is inserted for use in a tube 6 clamped to the under side of the front bar $b$ and passing through holes formed in the cross bearers 3. At the front end of the tube 6 is a clamp 7 to grip the draft pole 5 and as a further security a pin (not shown) may be provided to pass through holes in the tube 6 and pole 5. Attached to the tube 6 and projecting downward from it is a bracket 8 (see Fig. 3) having a socket portion 9 through which the pole may be passed when the cart is folded up.

A seat 10 is provided having dowels 11 (see Fig. 1$^a$) on its under side adapted to enter sockets 12 carried from the two middle stanchions $h$ of the front folding member. A step 13 is attached to the lower ends of the said stanchions by having semi-cylindrical portions 14 to embrace the stanchions and be secured thereagainst, by pins 15 passing behind the stanchions and through holes 16 in the ears on the semi-cylindrical portions.

In cases in which it is desired to use the cart with the back let down to a horizontal position the said back may be supported on chains in the usual manner and a stay 17 may then be employed adapted to be passed across the rear end of the cart to join the two sides and keep their upper edges rigidly in relation to each other. The said stay is pivoted to a clip 18 which is adapted to turn on one of the bars $d$ and a hook 20 is provided on the other end to engage the opposite bar $d$.

The sides and ends of the cart may be provided with wirework as shown.

Each wheel may be secured upon the axle by a cap 21 having a boss 22 and a pin or split cotter 23 adapted to pass through holes in the boss and axle.

To fold up the cart the wheels, seat, step and pole are detached, next the rear joint members $m$ are disengaged from the joint members $k$ and the rear member folded down. Next each side folding member has its remaining joint member disconnected from the corresponding joint member of the front folding member and the side members are then folded down on to the floor or bottom of the cart. After this the end members are folded under the cart as far as they will go and are secured in their folded up position by the passing of the draft pole 5 under the bars $g$ $g$ and through the socket 9.

In some cases especially with four wheeled vehicles where a fore carriage is usually employed the floor instead of being positioned between the levels of the side and end bars may come beneath the level of the lower bars.

Figs. 13 and 14 illustrate a modification in which a leg 19 is provided hinged to one of the corner pieces $c$ and adapted to be folded back under the cart when not required for use. When the leg is set up it is secured by a hand screw 24 passed through an upward extension of the leg and screwing into the corner pieces $c$. Such a leg may if desired be provided at each corner.

When the wheels are removed the cart may be employed as a cot such as for hospitals by giving it rigid support such as by the legs above described and in such a case the axle springs (if any) and clips for the springs may be removed if desired.

In some cases it may be preferred to arrange the cart so that the side members fold in underneath and the end members over the top of the cart bottom or floor, in which case the side bars $a$ would be placed below the level of the floor and the end bars $b$ above the level thereof. The end and side bars may if preferred be on the same level as the floor the lower edges of the sides and ends being then cranked or turned at a right angle for a short distance to allow the sides and ends to be folded against the floor of the cart in which case the sides could be folded underneath if preferred and the ends over the top of the floor. If the side or ends of the cart or wagon are of such a height that they overlap when folded one of such sides (or ends) may be cranked at its lower edge and the other be straight both being hinged to side bars (or end bars) level with the floor, or one may be cranked more than the other.

In the case where the cart is used to carry invalids or as a cot the bedding, etc., could be held down during transport by the sides or ends as the case might be coming thereupon.

If the front end folding member is adapted to fold under the floor of the cart and is provided with wire-work a recess 25 will need to be left therein to clear the tube 5.

In the modification shown in Fig. 15, the axle is clamped directly to the side bars of the frame instead of being joined thereto through springs and has a downwardly projecting pin $25^a$. The draft pole 26 in this case has a tapered inner end adapted to enter a taper socket of an extension pole 27. The extension pole is made detachable and has its front end carried in a socket 28 which is clamped to the front bar $b$, and its rear end supported by being passed over the pin $25^a$ and secured thereon by a hand nut 29. The inner end of the draft pole is secured within the end of the extension pole 27 and the latter within the socket 28 by pins $27^a$ and 30 which pass through corresponding holes in the socket, draft pole and extension pole. The taper end to the draft pole is given a downward inclination toward the extension pole and the taper of the latter an upward inclination toward the draft pole, so that if the latter is turned a half turn, it will have an upward inclination which is necessary if oxen are to be yoked to the cart.

To use the cart or wagon as a pontoon to transport persons or goods across rivers or the like or to form part of a pontoon bridge, the wheels are removed and replaced by hollow watertight adjuncts 31 (see Figs. 16 and 17) arranged preferably longitudinally of the cart, one on each side and engaging with the ends of the axles and being preferably fixed thereto such as by caps or plates 32 clamped over the axle ends. In cases where the cart has only two wheels and consequently only a central axle, each adjunct engages also with the corner pieces $c$, which join the side bars of the cart to the end bars, such as by the vertical stops 33 fixed on the adjuncts and coming at each side of each corner piece.

The watertight adjuncts may consist conveniently of elongated steel chambers incased in wood to protect them from injury.

In cases in which draft animals are to be harnessed to the cart suitable draft hooks may be provided, also instead of the draft pole, shafts may be provided and be made detachable similarly as the draft pole described.

Having fully described my invention what I claim and desire to secure by Letters Patent is:—

1. In a folding cart or wagon the sides pivotally connected with the bottom and foldable against the upper face thereof, the ends pivotally connected with the bottom and foldable against the under face thereof, and a detachable draft piece which may be placed in position immediately under the ends when they have been folded up and may be fixed in such position to lock the ends in place.

2. In a folding cart or wagon a bottom frame which comprises round side and end bars, sides and ends of the body having vertical tubular members which are hinged to the frame by eyes which surround the frame members, and bars of solid lubricating material within tubular members of the sides and ends which rest at their lower ends upon the members of the frame and lubricate the joints between the sides and ends and the frame.

3. In a folding cart or wagon a frame comprising two side bars two end bars and corner pieces into which said bars join and of which the side bars are at a different level from the end bars, a floor supported by the frame, and the folding sides and ends pivotally connected with the side and end bars of the frame, respectively, by eyes of the sides and ends which surround the bars.

4. In a folding cart or wagon, a bottom frame, sides and ends pivotally connected therewith and an upper corner joint between an end and side, comprising a block on one of the parts to be joined, formed with two cheeks projecting from a base which extends at one side beyond the inner ends of the cheeks to form a shoulder, and a block on the corresponding end of the other member to be joined which is formed with notches in its upper and lower faces, respectively, to receive the cheeks of the other block, and leave such cheeks flush with the upper and lower faces of the block with which they engage, and with a projection at one side whereby when the two blocks are properly engaged with one another they are together of a true rectangular shape, as seen looking toward any face thereof.

5. In a folding cart or wagon a bottom frame, sides and ends pivotally connected therewith and an upper corner joint between an end and side comprising a block on one of the parts to be joined formed with a hole therethrough to receive a dowel and with a shoulder at the inner side of its inner end, and a block on the corresponding end of the other member to be joined which is formed with a dowel to enter the hole of the other block and with a notch in its inner corner which is toward the other block, whereby when the two blocks are properly engaged with one another they are together of a true rectangular shape as seen looking toward any face thereof.

6. In a folding cart or wagon the ends foldable underneath the bottom or floor, an inner or extension pole detachably fixed under the body, a socket on the forward end of such pole and a forward pole having its rear end adapted to fit within said socket.

7. In a folding cart or wagon the ends foldable underneath the bottom or floor, an inner or extension pole detachably fixed under the body and adapted to receive a forward pole, and said inner pole carried at its forward end within a socket which is fixed to the body and its rear end carried by a pin which is rigid with the body, said inner pole being removable to allow of the folding up of the ends of the body and when replaced passing under such ends and securing them in their folded up positions.

In witness whereof I have hereunto signed my name this 19th day of May 1911 in the presence of two subscribing witnesses.

WALTER D. DOUGLAS-JONES.

Witnesses:
 ALFRED H. WATKINS,
 E. GLEESON ROBINSON.

Copies of this patent may be obtained for five cents each, by addressing the "Commissioner of Patents, Washington, D. C."